United States Patent
Forsman et al.

(10) Patent No.: US 8,485,600 B2
(45) Date of Patent: Jul. 16, 2013

(54) TETHER FOR A VEHICLE SEAT

(75) Inventors: Lars Forsman, Torslanda (SE); Peter Rundberget, Göteborg (SE); Magnus Eriksson, Göteborg (SE); Mario Ligovic, Ytterby (SE)

(73) Assignee: Volvo Lastvagnar AB, Göteborg (SE)

( * ) Notice: Subject to any disclaimer, the term of this patent is extended or adjusted under 35 U.S.C. 154(b) by 252 days.

(21) Appl. No.: 12/867,270

(22) PCT Filed: Feb. 12, 2008

(86) PCT No.: PCT/SE2008/000116
§ 371 (c)(1),
(2), (4) Date: Sep. 28, 2010

(87) PCT Pub. No.: WO2009/102241
PCT Pub. Date: Aug. 20, 2009

(65) Prior Publication Data
US 2011/0204684 A1    Aug. 25, 2011

(51) Int. Cl.
*B60N 2/427* (2006.01)

(52) U.S. Cl.
USPC ............... 297/216.17; 296/68.1; 297/216.13; 297/344.16

(58) Field of Classification Search
USPC ............... 297/216.1, 216.13, 216.16, 216.17, 297/216.19, 216.2, 344.15, 344.16, 344.17; 296/68.1
See application file for complete search history.

(56) References Cited

U.S. PATENT DOCUMENTS

| | | | |
|---|---|---|---|
| 3,560,048 A | 2/1971 | Flint | |
| 3,737,197 A | 6/1973 | Hall et al. | |
| 3,811,727 A | 5/1974 | Rumpel | |
| 3,957,304 A * | 5/1976 | Koutsky et al. | 297/216.1 |
| 4,025,110 A | 5/1977 | Poorman | |
| 4,092,009 A | 5/1978 | Koutsky | |

(Continued)

FOREIGN PATENT DOCUMENTS

| | | |
|---|---|---|
| DE | 9405053 | 7/1995 |
| DE | 10261893 A1 | 7/2004 |

(Continued)

OTHER PUBLICATIONS

International Search Report for corresponding International Application PCT/SE2008/000116.

(Continued)

*Primary Examiner* — Peter Brown
(74) *Attorney, Agent, or Firm* — WRB-IP LLP (57) ABSTRACT

A vehicle seat includes a backrest frame and a seat frame connected to each other to form a seat structure. The seat includes a seat base adapted to be rigidly connected to the frame structure of a vehicle, and which is connected to the seat frame via a seat suspension. The seat further includes a tether which at one of its ends is attached to the seat back at a first, upper attachment point and at its other end attached at a second, lower attachment point in order to improve the strength of the seat in case of an accident. The seat is provided with at least one lever arm on the back side of the seat which shall be used as an attachment point for the tether or as a guide or support for the tether located in between the upper attachment point and the lower attachment point.

12 Claims, 5 Drawing Sheets

U.S. PATENT DOCUMENTS

| | | | |
|---|---|---|---|
| 4,784,434 A | | 11/1988 | Iwami |
| 4,813,645 A | | 3/1989 | Iwami |
| 5,015,010 A | | 5/1991 | Homeier et al. |
| 5,020,856 A | | 6/1991 | George |
| 5,169,112 A | * | 12/1992 | Boyles et al. ............... 248/550 |
| 5,642,916 A | | 7/1997 | Dybro et al. |
| 6,045,186 A | | 4/2000 | Butt et al. |
| 6,109,691 A | * | 8/2000 | Gray et al. ............... 297/216.17 |
| 6,152,526 A | * | 11/2000 | Persson et al. ........... 297/216.13 |
| 6,264,163 B1 | | 7/2001 | Ivarsson |
| 6,481,777 B2 | * | 11/2002 | Mans ........................... 296/68.1 |
| 6,644,737 B2 | * | 11/2003 | Kohl et al. ................. 297/217.1 |
| 7,575,206 B2 | * | 8/2009 | Meier et al. .............. 297/344.12 |
| 2002/0130528 A1 | | 9/2002 | Mans |
| 2007/0096513 A1 | | 5/2007 | Jones et al. |

FOREIGN PATENT DOCUMENTS

| | | |
|---|---|---|
| DE | 10261894 A1 | 7/2004 |
| FR | 2201659 A5 | 4/1974 |
| GB | 2320184 A | 6/1998 |
| GB | 2339145 A | 1/2000 |
| SE | 518767 C2 | 11/2002 |
| WO | 2004039643 A1 | 5/2004 |

OTHER PUBLICATIONS

International Preliminary Report on Patentability for corresponding International Application PCT/SE2008/000116.
Supplementary European Search Report (Oct. 11, 2012 for corresponding European App. EP 08 71 2709.

* cited by examiner

TETHER FOR A VEHICLE SEAT

DETAILED DESCRIPTION

The invention relates to a vehicle seat and the construction of the vehicle seat in order to provide a robust structure which will assure the safety of an occupant in the seat in case of an accident. In particular, the invention relates to a seat having a seat belt of the "belt in seat"-kind.

In vehicles today, one of the major issues is the security of the occupants, i.e. the driver or a passenger. In addition, the comfort of the occupants is also of high priority and in particular for vehicles used for commercial activities where the seat also is the work place. The driver's seat of these kind of vehicles is usually equipped with an advanced suspension system in order to provide a satisfactorily comfort during several hours of being seated in the seat. One specific problem in this case is the mounting and location of the seat belt. In general, e.g. in the case of an ordinary vehicle, the seat belt may be mounted to the frame of the vehicle and thus offering a satisfactorily attachment of the passenger to the vehicle and the seat in case of an accident. However, in the case of a seat having a flexible suspension, such an attachment may cause discomfort for the occupant of the seat since the belt may restrain the occupant of the seat if the seat itself is flexible and moving with respect to the frame structure of the vehicle while the belt is attached to the frame and thus may be tightened when the seat is moved. A solution to this problem is the so called "Belt In Seat" (BIS) solution wherein the seat belt is attached to the seat instead of to the frame of the vehicle. However, in case of an accident, the forces working on the attachment of the vehicle seat to the vehicle and the seat structure itself will be very large since all the forces from the body located in the seat will be working on the seat and the connection of the seat to the vehicle. In the case when the belt is attached directly to the frame, only a part of the forces will be taken care of by the seat and its connection of the seat to the vehicle frame and the major part of the forces will be absorbed directly by the vehicle's frame by the connection of the belt to the frame.

In order to secure that the attachment of the seat to the vehicle for a belt in seat construction will be sufficient in the case of an accident, it has been suggested several different arrangements to assure such an attachment by the use of e.g. a tethering strap to the vehicle. In U.S. Pat. No. 5,015,010 is described such a solution wherein a tether strap is anchored in the floor of the vehicle an connected to the upper part of the back seat via a tether guide attached to the wall behind the seat back. U.S. Pat. No. 5,642,916 describes another solution wherein a tether strap is connected to the bottom of the seat portion from the wall behind the seat. WO 2004/039643 describes still another solution where a tether strap is connected to the seat which is adapted to retract and be adapted to the desired portion of the seat. All these different tethering arrangements provide an efficient tethering arrangement which seems to work well when they have been mounted in the vehicle. However, all these arrangements include the feature of attaching a tether strap anchored in the vehicle frame, either its walls or floor, to the seat structure. In many cases it is very tight to mount these structures, there is not very much space between the seat and the wall structure behind in many cases, and the seat and its interconnection with each different model of vehicle must be adapted to fit in the tether strap in an adequate position. In U.S. Pat. No. 6,045,186 is described another tether strap which interconnects the seat back with the seat base structure. In this case the tethering arrangement is not dependent on being adapted to be fitted in for different vehicle models since it is contained completely in the seat structure. However, this arrangement does not provide a structure which may resist large forces since the direction of the counteractive force restricting the movement of the seat, and in particular the seat back, is working in an inefficient direction since it is connected to the seat base structure. Hence, neither this arrangement provides a solution of how to provide a tethering arrangement for a Belt In Seat structure which adequately may withstand the forces which may occur in an accident and which may be easily mounted to a multitude of different vehicle models without having to be adapted to the driver's cabin for different vehicles.

Hence, there is still a need to provide an improved vehicle seat structure for a tethering arrangement which is robust enough to withstand the forces caused in the event of an accident and also may be easily mounted to a multitude of different kinds and models of vehicles and not need to be particularly adapted to the design of the drivers compartment of different vehicles and demanding a specific connection of a tethering wire between the frame structure and the seat.

The present invention provides a vehicle seat which overcomes the deficiencies of the above described seats. According to the invention, this problem is solved by the use of a tether support structure, e.g. one or several lever arms. The support structure is able to prolong the total lever arm and redirect the direction of the counteractive force working to withstand the forces on the vehicle seat in the case of an accident so as to improve the performance of the tethering arrangement. Hence, the inventive arrangement provides better securing of the seat position and avoids undesired deformation of the seat in order to improve the safety for a person occupying the seat.

When referred to directions such as up or down, these referrals are to be interpreted as the directions corresponding to the directions when the seat is mounted in the vehicle. The same is valid for locations respectively directions such as front part or forward, which indicates a location closer to or facing towards the front of the car, and rear part, backside or backwards indicate a location closer to or facing the rear of the vehicle.

Hence, an aspect of the invention relates to a vehicle seat comprising a backrest frame and a seat frame connected to each other to form a seat structure. The seat further comprises a seat base adapted to be rigidly connected to the frame structure of a vehicle, e.g. by welding, bolting, nailing or any suitable method. The seat base is connected to the seat frame via a seat suspension which enables the seat to move relatively the vehicle frame in order to improve the comfort for a person seated in the seat. The seat also comprises a tether which at one of its ends is attached to the back of the seat at a first, upper attachment point and at its other end attached at a second, lower attachment point. In this context, the tether may be realised by a wide variety of constructional elements such as a wire, belt, chain, rope, sheet metal or any kind of structure which is able to flexibly allow certain movement between the attachment points but being able to restrain movement outside a certain limit, e.g. outside a certain maximum distance or movements above a certain velocity or acceleration.

The invention is directed, according to an aspect thereof, to the feature of providing such a seat as described above with at least one lever arm on the back side of the seat. The lever arm may be used as the upper attachment point for the tether and/or as a lower attachment point for the tether and/or to be used as a guide or support for the tether located in between the upper attachment point and the lower attachment point.

Hence, a single lever arm may be used as a guide or support for the tether wire, located in between the upper and the lower attachment point of the tether and cause the tether to bend or deflect at its contact point with the lever arm. In one embodiment, this lever arm may be attached to the seat frame. However, this lever arm may also be attached to the backrest frame or the fundament. It may also be attached to the suspension arrangement, preferably to a rigid part of the suspension. However, such a rigid part may be considered as a part of some of the other subunits, e.g. the seat frame or the seat base.

The vehicle seat may also comprise a lever arm to be used as the upper attachment point for the tether. This lever arm may be the only lever arm to be used or may be used together with the guiding lever arm described above. The lever arm used as an upper attachment point may for example be attached to the backrest frame. It may be attached at the lower part of the backrest frame or higher up depending on the force characteristics and space available beyond the seat back for the lever arm. An advantageous feature by attaching the upper end of the tether to a lever arm connected to the backrest frame is that the tether arrangement will improve the rigidity of the connection between the backrest frame and the seat frame. However, it is also possible to attach the upper end of the tether to the seat frame, or an upper part of the suspension, which will provide a more compact tethering arrangement.

The vehicle seat may also comprise a lever arm to be used as the lower attachment point for the tether. This lever arm may be the only lever arm to be used or may be used together with either of or both the guiding lever arm and the upper attachment lever arm. Normally at least one of these two lever arms is used together with the lower attachment point lever arm described above. The lower attachment point lever arm may be attached to the seat base or to the lower part of the suspension The lower end of the tether may also be directly attached to the seat base and forming a tethering arrangement with a guiding lever arm or an upper attachment point lever arm or both of them. Furthermore, the upper end of the tether may be directly attached to the backrest frame, or an upper part of the seat frame, thus forming a tethering arrangement with a guiding lever arm and, if desired, also a lower attachment point lever arm.

The tether shall be designed such that the seat suspension may work satisfactorily without being prevented from the ordinary movements due to normal driving conditions. Hence, the tether may be designed such that it is rigidly fixed at both its ends and having an extension length such that the tether is slack or loose during ordinary conditions and normal movement of the seat due to the flexibility of the seat suspension but in case of an accident, when the seat is subject to large forces and the seat is under extreme stress such that the attachment points of the tether is separated to the maximum allowed limit, the tether is stretched and tensioned in order to restrict further movement of the seat parts connected by the tether. In an alternative embodiment, a retractor may be incorporated in the tether arrangement such that the tether will allow relatively slow movements of the seat but will act in restricting the movement when the acceleration of movement of the attachment points of the tether away from each other goes beyond a certain limit, i.e. functioning generally as a normal seat belt provided with a retractor.

In order to still improve the rigidity of the seat and to prevent the front part of the seat to collapse due to the improved rigidity in the seat structure from the above described tethering arrangement, it might be needed to add some extra rigidity to the front part of the seat. The front of the seat may thus be provided with a damper which is designed to withstand the forces working to compress the front of the seat frame towards the seat base. The damper shall not be too sensitive for ordinary driving of the vehicle and shall preferably not lock the suspension due to irregularities in the road, minor brake actions or the like circumstances.

As disclosed above, an aspect of the invention is particularly advantageous in the case of a "belt in seat-construction where the seat belt is anchored in elements of the seat since one of the benefits with the present invention is that it provides a solution for a secure fastening of a seat and an occupant to a seat without the need of attaching or anchoring the seat to the vehicle at any other point than at its base and thus provide an easy mounting of the seat to the vehicle.

Further advantages and features of aspects of the invention will follow below where aspects of the invention are exemplified with embodiments.

DETAILED DESCRIPTION

When referred to directions in the figures such as up or down, these referrals are to be interpreted as the directions corresponding to the directions when the seat is mounted in the vehicle. The same is valid for locations respectively directions such as front part or forward, which indicates a location closer to or facing towards the front of the car, and rear part, backside or backwards indicate a location closer to or facing the rear of the vehicle.

Figure 1:
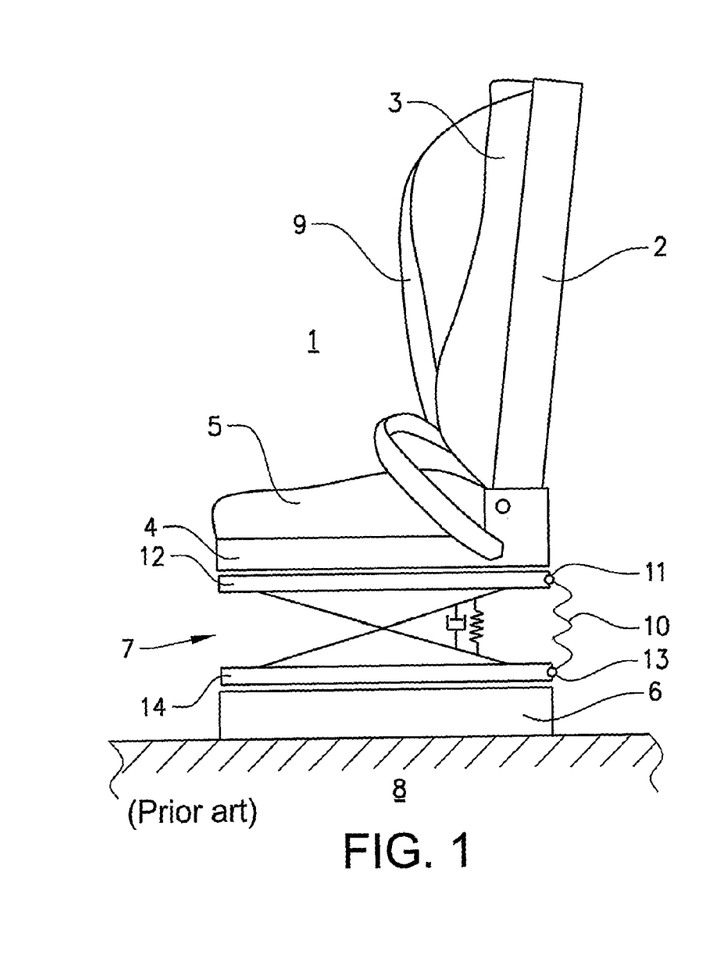
FIG. 1 shows a vehicle seat according to prior art

FIG. 1 shows a seat 1 according to the state of the art today. The seat 1 comprises a backrest frame 2 provided with a backrest cushion 3 and a seat frame 4 provided with a seat cushion 5. The seat frame 4 is attached to a seat base 6 via a seat suspension 7. The seat base 6 is attached to the floor structure 8 of a vehicle (not shown). The seat 1 is further provided with a seat belt 9 which is intended to secure an occupant to the seat in case of an accident. The seat is also provided with a tether 10 attached to an upper attachment point 11 located at an upper frame 12 of the seat suspension 7 and to a lower attachment point 13 located at a lower frame 14 of the suspension 7.

Figure 2:
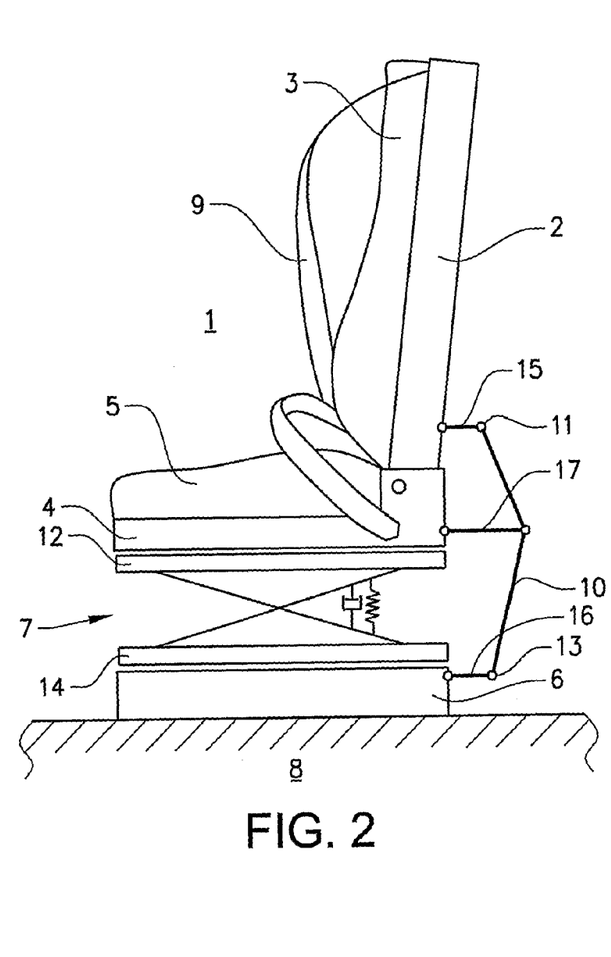
FIG. 2 shows a vehicle seat according to a first embodiment of the present invention

FIG. 2 shows a seat 1 according to a first embodiment of the invention. Where not otherwise indicated, the reference numbers used in FIG. 2 represents the same features as in FIG. 1. The tether 10 is attached at its upper attachment point 11 to the backrest frame 2 via an upper lever arm 15 and attached at its lower attachment point 13 to the seat base 6 via a lower lever arm 16. The tether is further guided by a third, middle lever arm 17 which is attached to the seat frame 4

Figure 3:
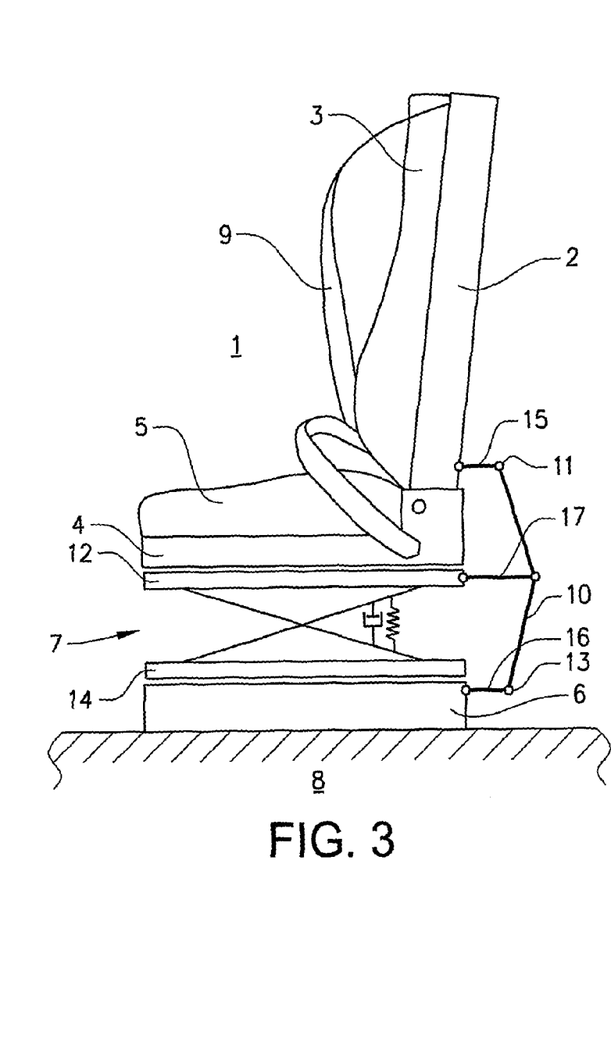
FIG. 3 shows a vehicle seat according to a second embodiment of the present invention

FIG. 3 shows a seat 1 according to a second embodiment of the invention. The tether 10 is attached at its upper attachment point 11 to the backrest frame 2 via an upper lever arm 15 and attached at its lower attachment point 13 to the seat base 6 via a lower lever arm 16. The tether is further guided by a third, middle lever arm 17 which is attached to the upper frame 12 of the seat suspension arrangement 7.

Figure 4:
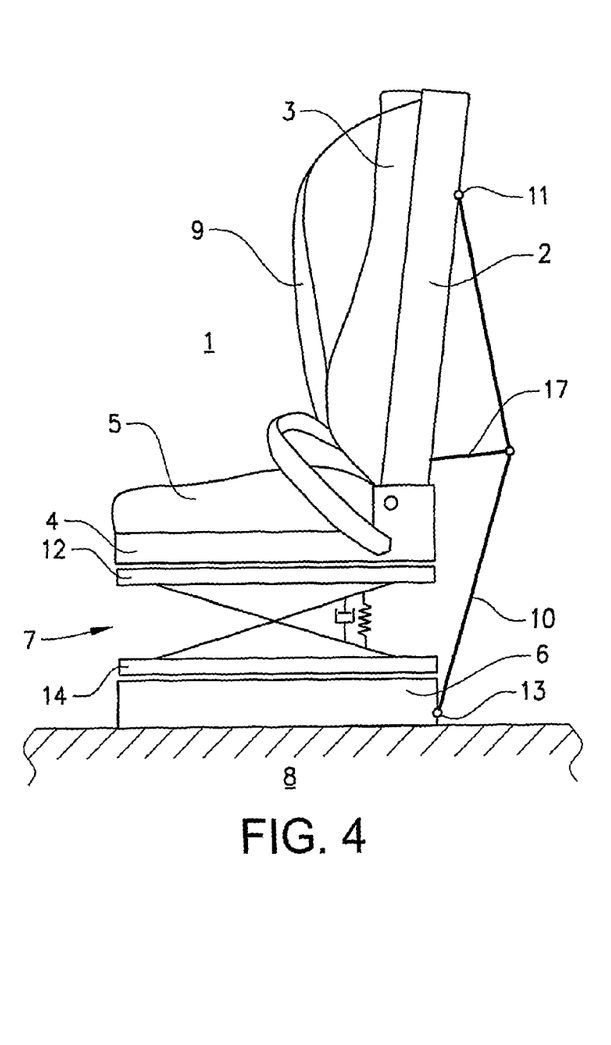
FIG. 4 shows a vehicle seat according to a third embodiment of the present invention

FIG. 4 shows a seat 1 according to a third embodiment of the invention. The tether 10 is attached at its upper attachment point 11 directly to the upper part of the backrest frame 2 and attached at its lower attachment point 13 directly to the seat base 6. The tether is further guided by a lever arm 17 which is attached to the lower part of the backrest frame 2 between the upper and lower attachment points 11, 13.

Figure 5:
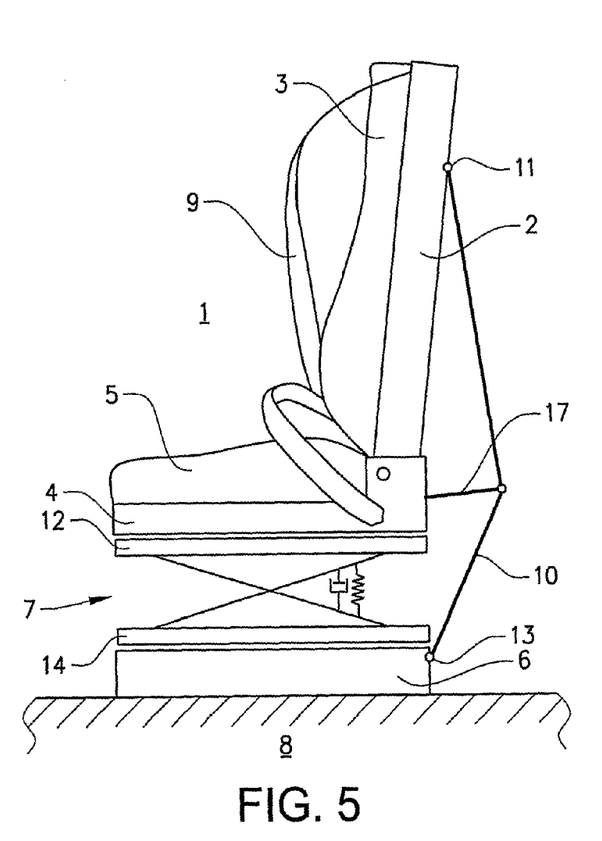
FIG. 5 shows a vehicle seat according to a fourth embodiment of the present invention

FIG. 5 shows a seat 1 according to a fourth embodiment of the invention. The tether 10 is attached at its upper attachment point 11 directly to the upper part of the seat frame 4 and attached at its lower attachment point 13 directly to the seat base 6. The tether 10 is further guided by a lever arm 17 which is attached to the seat frame 4 between the upper and lower attachment points 11, 13.

To be noted, in both FIGS. 4 and 5, the tether 10 may also be attached at its upper attachment points 11 via a lever arm in order to prolong the lever arm for the tether arrangement in order to withstand the forces in the case of a crash situation.

Figure 6:
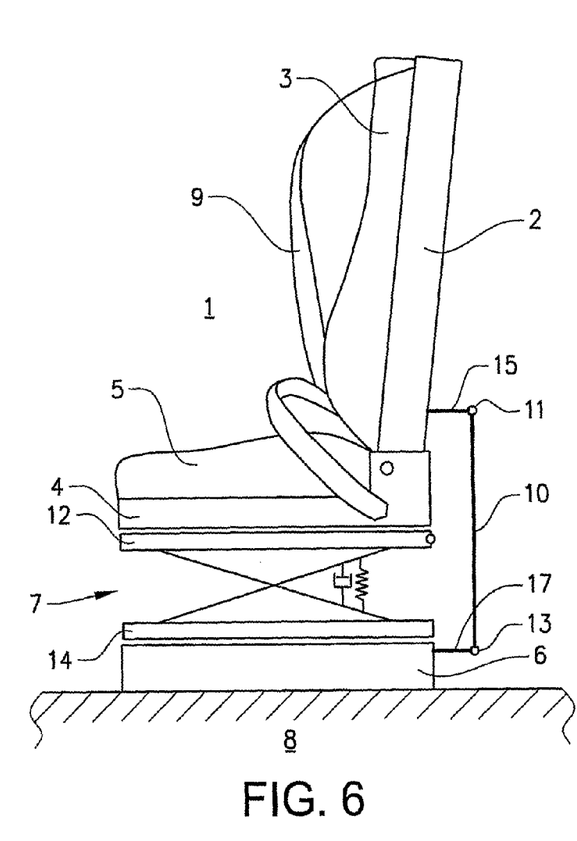
FIG. 6 shows a vehicle seat according to a fifth embodiment of the present invention

FIG. 6 shows a seat 1 according to a fifth embodiment of the invention. The tether 10 is attached at its upper attachment point 11 to the backrest frame 2 via an upper lever arm 15 and attached at its lower attachment point 13 to the seat base 6 via a lower lever arm 16. In this case, on the contrary to the embodiments shown in FIGS. 2-5, there is no lever arm used between the two attachment points 11, 13 of the tether 10.

Figure 7:
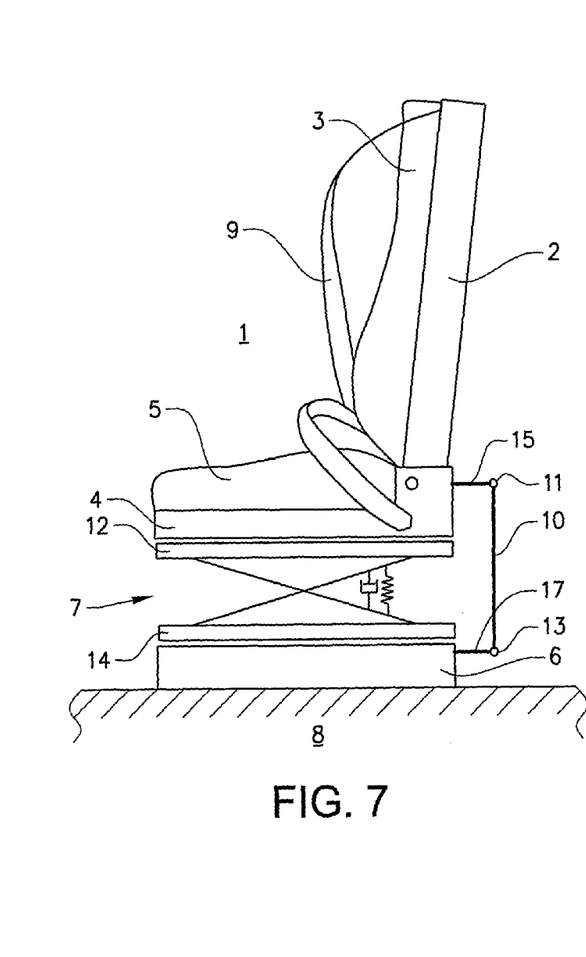
FIG. 7 shows a vehicle seat according to a sixth embodiment of the present invention

FIG. 7 shows an arrangement similar to the one shown in the previous figure but in this embodiment is the tether 10 attached at its upper attachment point 11 to the seat frame 4, via an upper lever arm 15. This will make the tether arrangement more compact. However, in this case will the tether 10 not be able to restrain any forces which work on the conjunction of the backrest frame 2 and the seat frame 4, which may be a weak point in a seat, and the tether 10 does not give any additional support for the backrest frame 2.

The general purpose of the arrangements disclosed in FIGS. 2-7 is to improve the performance of the tethering arrangement by prolonging the lever arm for the force counteracting the forces working on the seat in the case of an accident. When an accident occurs, and in particular when a belted person is occupying a seat, there will be large forces working on the seat.

Figure 8:
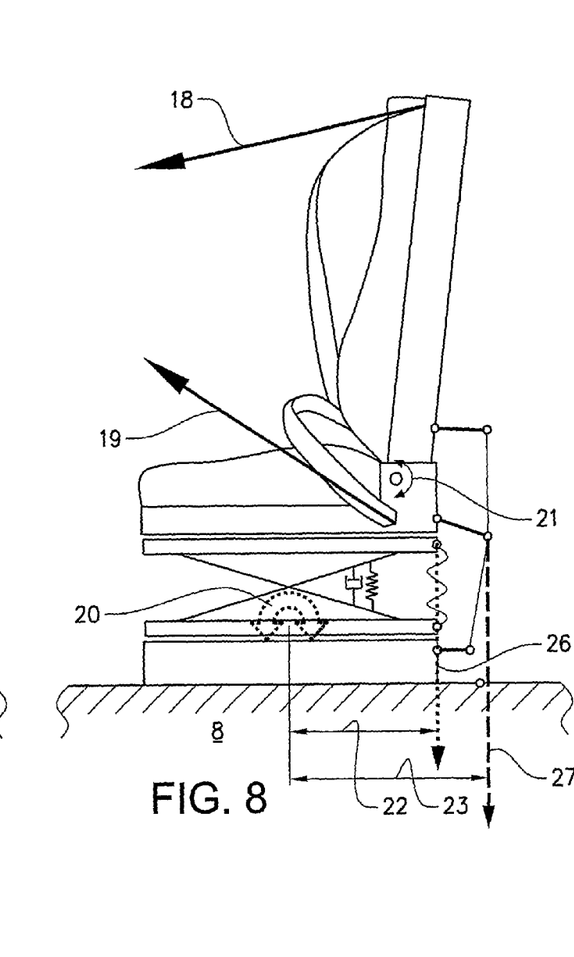
FIG. 8 shows comparative example of the effect of the invention compared with prior art.

In FIG. 8 it is indicated by arrows 18, 19 some of the major forces working on the seat 1 due to the action of the seat belt 9 in case of a collision. These forces will act so as to induce a bending moment working on certain attachments points and connections of the seat structure and its attachment to the vehicle frame. In FIG. 8, two points of an ordinary seat today has been identified and pointed out by semicircular arrows 20, 21 indicating where a critical turning momentum may be found. In FIG. 8 is also visualised the total length of the lever arms for the tether arrangements in FIG. 1 (prior art), indicated by arrow 22, and FIG. 2 (the first embodiment of the invention), indicated by arrow 23, with respect to the rotation centre indicated by arrow 20. These reaction forces are indicated by arrow 26, representing the reaction force for a prior art arrangement as described in FIG. 1, and by arrow 27, indicating the reaction force from the arrangement according to the present invention as described in FIG. 2 for example. From this figure it is obvious that the lever arm arrangement according to the present invention will prolong the lever arm with respect to this rotational point. For the rotational centre identified and indicated by arrow 21 no comparison is made since the prior art arrangement do not contribute with any counteractive force at all while the arrangement (as described in for example FIG. 2) provides a solution which counteracts such a rotational movement. In many cases it may be a problem to identify exactly where the rotational centre, or centres, is located. However, by the use of specific lever arms (15-17) as described in FIGS. 2-7, the total length of the lever arm with respect to the rotational centres will be increased. Furthermore, by dimensioning the length and location of the lever arms it will be possible to control the direction of the counteractive force in order to efficiently prevent rotation or bending. The specific constructional details of the tether arrangement should be adapted and tried out for different seats in order to work satisfactorily.

Even though there is an improvement with the new tether arrangement as described in FIGS. 2-7, the new arrangement may cause side effects due to the better rigidity in certain parts of the seat.

Figure 9:
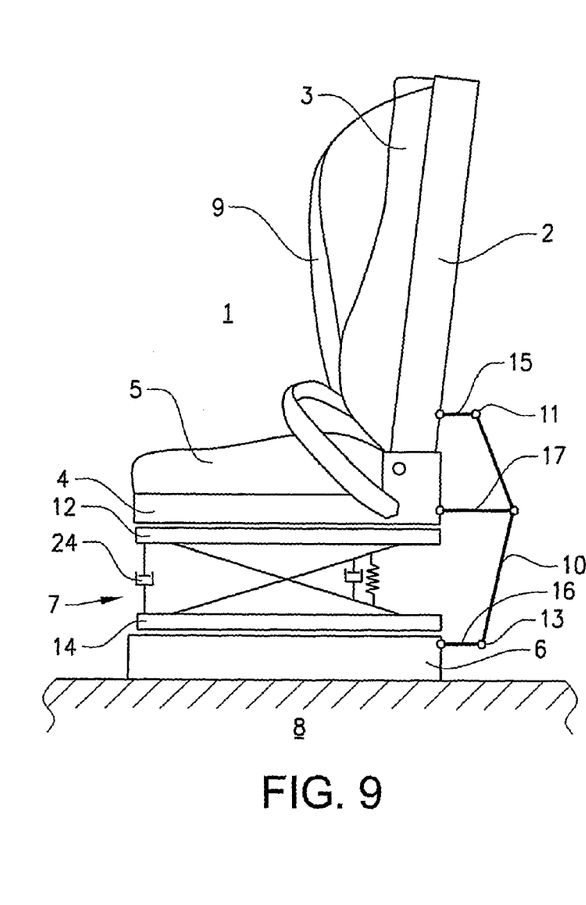
FIG. 9 shows an additional dampening device suitable to be incorporated in any of the embodiments shown in FIGS. 2-7.

In FIG. 9, which basically is the same as FIG. 2, an additional feature of using a damper 24 is shown. The damper 24 is located in the front part of the seat suspension 7. The purpose of the damper 24 is to prevent contraction of the front part of the seat 1 in case of an accident and thus provide a stiff suspension in case of an emergency. Due to the better rigidity in the seat 1 by using the new tether arrangement, there will be larger forces working to compress the seat and in particular the front of the seat. This damper 24 is thus designed to prevent undesired compression of the front part of the seat. In case of an accident, e.g. a frontal collision, an occupant of the seat 1 will effectuate a large force on the backrest frame 2, directed in the forward direction, due to the connection of the occupant to the seat 1 by the seat belt 9. The load from the occupant caused by the accident will cause a rotating motion of the seat suspension 7 such that the front part of the seat frame 4 will be forced downward and effectuate a downward motion of the seat front and thus prevent the front part of the vehicle seat frame 4 to be compressed towards the seat base 6. The damper is designed to support when there is a sudden, fast compression of the front of the seat like in the case of a head on collision or a sudden braking action. When there is a slow compression or change in the seat position like under ordinary travelling conditions, e.g. due to irregularities in the road or a light braking of the vehicle, the additional damper will normally not have any major impact on the normal suspension for comfort travelling. The damper may also be an integrated part of the suspension system providing the same feature of having a stiff dampening of the front part of the seat in case of a sudden compression and need not to be a separate unit as described in FIG. 9.

Figure 10:
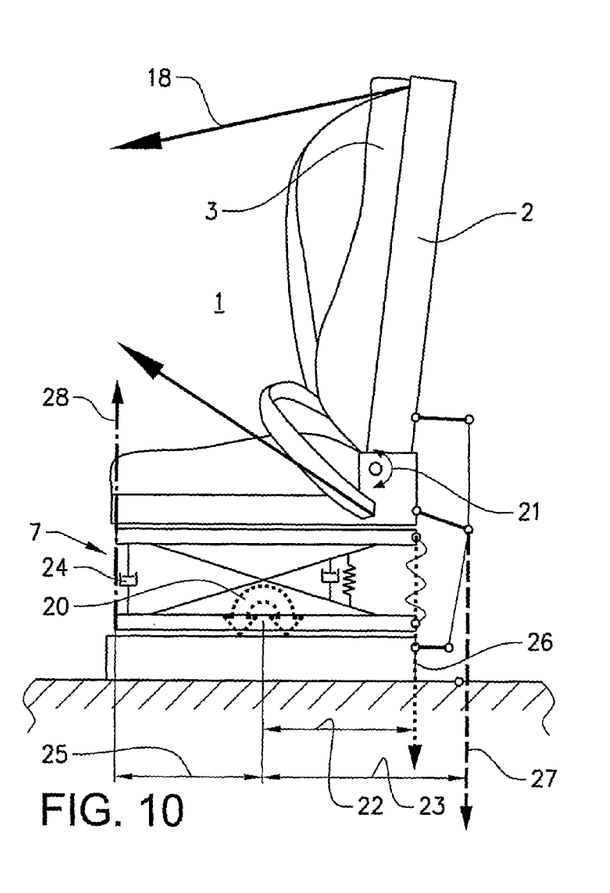
FIG. 10 shows the effect of the additional dampening device

FIG. 10 describes essentially the same scenario as FIG. 8 but having the additional damper 24 in function. Even though the damper 24 may be located at various locations in the seat suspension structure 7, it is preferably located near the front part of the seat 1 such that the lever arm 25 of the reactive force 28 from the damper 24 with respect to the rotational centre 20 is sufficiently long to provide a sufficient reaction force. It is obvious from FIG. 10 that the additional damper 24 will counteract the force from an accident, indicated by arrow 18 at the upper part of the seat back 2, 3, inducing a bending moment at rotational centre 20 by providing a force directed upwards at the front of the seat 1. Hence, the damper 24 will essentially prevent the compression of the front of the seat 1 and thus prevent the rotational movement of the seat suspension 7 round the rotational centre 20. As is obvious, this will prevent the seat, and in particular the upper part of the seat back 2,3, of moving towards the front of the vehicle and thus avoid an undesired forward motion of an occupants body and head. Hence, the damper will further improve the safety characteristics of the seat in addition to the improvement provided by the new tether arrangement.

Even though the arrangement with the damper only is described in connection with the embodiment in FIGS. 9 and 10 it is obvious that this feature is suitable together with all the described embodiments and versions of the invention described herein.

The invention claimed is:

1. A vehicle seat comprising
   a backrest frame and a seat frame connected to each other to form a seat structure,
   a seat base adapted to be rigidly connected to the frame structure of a vehicle, the seat base being connected to the seat frame via a seat suspension,
   a tether having first and second ends, the first end of the tether being connected to a back side of the seat structure at a first, upper attachment point and the second end of the tether being connected at a second, lower attachment point to the seat base, and
   a plurality of arms, the arms each having a first end attached to one of the back side of the seat structure and the seat base, and the arms each having a second end attached to the tether.

2. A vehicle seat according to claim 1, comprising a first arm of the plurality of arms to be used as a guide or support for the tether located in between the upper attachment point and the lower attachment point of the tether which causes the tether to bend at its contact point with the first arm.

3. A vehicle seat according to claim 2, wherein the first arm is attached to the seat frame.

4. A vehicle seat according to claim 1, comprising a first arm of the plurality of arms forming the upper attachment point to the back side of the seat for the tether.

5. A vehicle seat according to claim 4, wherein the first arm is attached to the backrest frame.

6. A vehicle seat according to claim 4, wherein the first arm is attached to the seat frame.

7. A vehicle seat according to claim 1, comprising a first arm of the plurality of arms forming the lower attachment point to the seat base for the tether.

8. A vehicle seat according to claim 7, wherein the arm to be used as the lower attachment point for the tether is attached to the seat base.

9. A vehicle seat according to claim 1, wherein the upper attachment point for the tether is attached to the backrest frame.

10. A vehicle seat according to claim 1, wherein the seat suspension is provided with a damper which is designed to withstand the forces working to compress the front of the seat frame towards the seat base.

11. A vehicle seat according to claim 1, comprising a seat belt attached to the vehicle seat.

12. The vehicle seat according to claim 1, wherein at least two of the arms extend rearwardly of the seat structure and seat base.

* * * * *